US005818351A

United States Patent [19]

Neubauer

[11] Patent Number: 5,818,351

[45] Date of Patent: Oct. 6, 1998

[54] DATA TRANSFER SYSTEM

[75] Inventor: Martin Neubauer, Graz, Austria

[73] Assignee: Eastman Kodak Company, Rochester, N.Y.

[21] Appl. No.: 75,077

[22] Filed: Jun. 10, 1993

[30] Foreign Application Priority Data

Jun. 26, 1992 [DE] Germany .......................... 42 21 062.3

[51] Int. Cl.[6] .............................. H04B 3/00; H04B 13/00

[52] U.S. Cl. ................................ 340/825.62; 340/825.65; 340/825.2; 340/825.21

[58] Field of Search ......................... 340/825.65, 825.62, 340/825.54, 825.57, 825.2, 825.21, 825.14, 828.21; 375/120, 113, 106, 110; 370/102, 110.1, 110.4

[56] References Cited

U.S. PATENT DOCUMENTS

| | | | |
|---|---|---|---|
| 4,232,267 | 11/1980 | Hanajima et al. | 340/825.62 |
| 4,232,292 | 11/1980 | Yasuda et al. | 340/825.26 |
| 4,578,797 | 3/1986 | Satoh et al. | 375/106 |
| 4,637,037 | 1/1987 | Chao | 375/110 |
| 4,672,372 | 6/1987 | Miyahara et al. | 340/825.21 |
| 4,951,142 | 8/1990 | Glaab et al. | 340/825.14 |
| 5,086,500 | 2/1992 | Greub | 340/825.2 |

*Primary Examiner*—Thomas G. Black
*Assistant Examiner*—David Yirk Jung
*Attorney, Agent, or Firm*—Lawrence P. Kessler

[57] ABSTRACT

A data transfer system is disclosed in which digital signal conditions existing in different positions of series-connected units can serially be transferred, the transfer of the signal conditions being effected in synchronism with clock pulses emitted by a clock pulse generator 300 via a common data transfer line 71, the clock pulses being transferred via a common clock pulse line 70, and release signals between the units being transferred via release lines 72. The data transfer of signal conditions of units featuring transmitter/receiver means 1, 1' is controlled by suppressing predetermined clock pulses originating in the clock generator 301 of a signal processing means 2, the clock generator 301 being arranged in a bus control means 3 of the signal processing means 2 together with a process control means 30, said clock generator and said process control means being controllable by means of a microprocessor unit 4 of the signal processing means. The positions of the transmitter/receiver means 1, 1' are associated with successive stages 91, 92, 93, 94, 95, 96, 97, 98 for sensors 5 and actors 6. By means of the clock generator 301, the clock pulses for the transfer of signal conditions are suppressed for three clock periods for monitoring sensors 5, for two clock periods for controlling actors 6, and for one clock period for advancing from one stage to another 91, 92, 93, 94, 95, 96, 97, 98. The transmitter/receiver means 1, 1' features a process control means 10 in which a clock pulse monitoring means 101, 102, 103 and a transmitter/receiver control means 100 are arranged to detect the suppression of clock pulses, the suppression of one, two or three clock periods being recognized by means of the clock pulse monitoring circuit. The signal conditions of each of the stages 91, 92, 93, 94 having sensors 5 and/or of each of the stages 95, 96, 97, 98 having actors 6 can be monitored, controlled and evaluated with predetermined frequency by means of the microprocessor unit 4.

7 Claims, 6 Drawing Sheets

DATA TRANSFER SYSTEM

BACKGROUND OF THE INVENTION

This invention relates to a data transfer system in which digital signal conditions existing in different positions of series-connected units can serially be transferred, the transfer of the signal conditions being effected in synchronism with clock pulses emitted by a clock pulse generator via a common data transfer line, the clock pulses being transferred via a common clock pulse line, and release signals between the units being transferred via release lines.

Data transfer systems are known in which digital signal conditions existing in different positions of series-connected units can serially be transferred and which are used in complex technical equipment. In U.S. Pat. No. 4,232,292, a data transfer system is described for scanning or monitoring the condition of a plurality of switches arranged in different positions and associated with several units or transmitters. The data transfer system comprises a clock pulse generator for producing output clock pulses, transmitters each having a scanning means to pick up the clock pulses, gate circuits to pick up the output signals of the switches, and memory circuits to intermediately store the output signals of the gate circuits, the scanning means continuously and in synchronism with the clock pulses of the clock pulse generator applying output signals to the gate circuits, and the transmitters being connected by means of a common synchro line and a common signal line. Furthermore, the transmitters comprise a means for producing a release signal and a release line to release the scanning means of a following transmitter after monitoring the condition of all switches of a transmitter.

SUMMARY OF THE INVENTION

It is an object of the present invention to provide a data transfer system which permits a quick, failsafe and flexible operation, and in particular, a work-cycle which is easily adaptable to the individual requirements and comprises monitoring of sensors, e.g., switches, and/or controlling actors, e.g., motors. Moreover, variations in the number of sensors and actors should be possible by affording a minimum of wiring. The above object is obtained in that for transferring signal conditions the units featuring a transmitter/receiver means can be controlled by suppressing predetermined clock pulses of the clock circuit of a signal processing means.

In an advantageous embodiment of the invention, the clock circuit is arranged in a bus control means together with a process control means, the clock circuit and clock control means being controllable by means of a micro-processor unit of the signal processing means. Expediently, the data transfer system according to the invention is designed such that the transmitter/receiver means features a process control means in which a cycle monitoring circuit and a transmitter/receiver control means are arranged to detect the suppression of clock pulses, and that the position of transmitter/receiver means are associated with successive stages for sensors and actors.

By means of the clock circuit, the invention provides for the clock pulses for the transfer of signal conditions to be suppressed for the duration of three clock periods for monitoring the sensors and for the duration of two clock periods for controlling the actors, and for advancing from one stage to another for one clock period, the invention further providing for the suppression of one, two or three clock periods, such suppression being recognizable by means of a clock pulse monitoring circuit provided in the transmitter/receiver means. Advantageously, the signal conditions of each stage featuring sensors and/or actors are monitored, controlled and analyzed with predetermined frequency by means of the micro-processor unit.

Furthermore, the transmitter/receiver means comprises a release means by means of which a release signal to a successive transmitter/receiver means and an acknowledgement signal via a common acknowledgement line can be transferred to the bus control means which has an acknowledgement counter, the counter reading of which is decremented by the acknowledgement signal, and the clock pulse counter the predeterminable counter reading of which is decremented by clock pulses of the clock pulse control circuit, the transmitter/receiver means being controlled in response to a result obtained by comparing the two counter readings performed by a checking means and the process control means of the bus control means.

The inventions, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
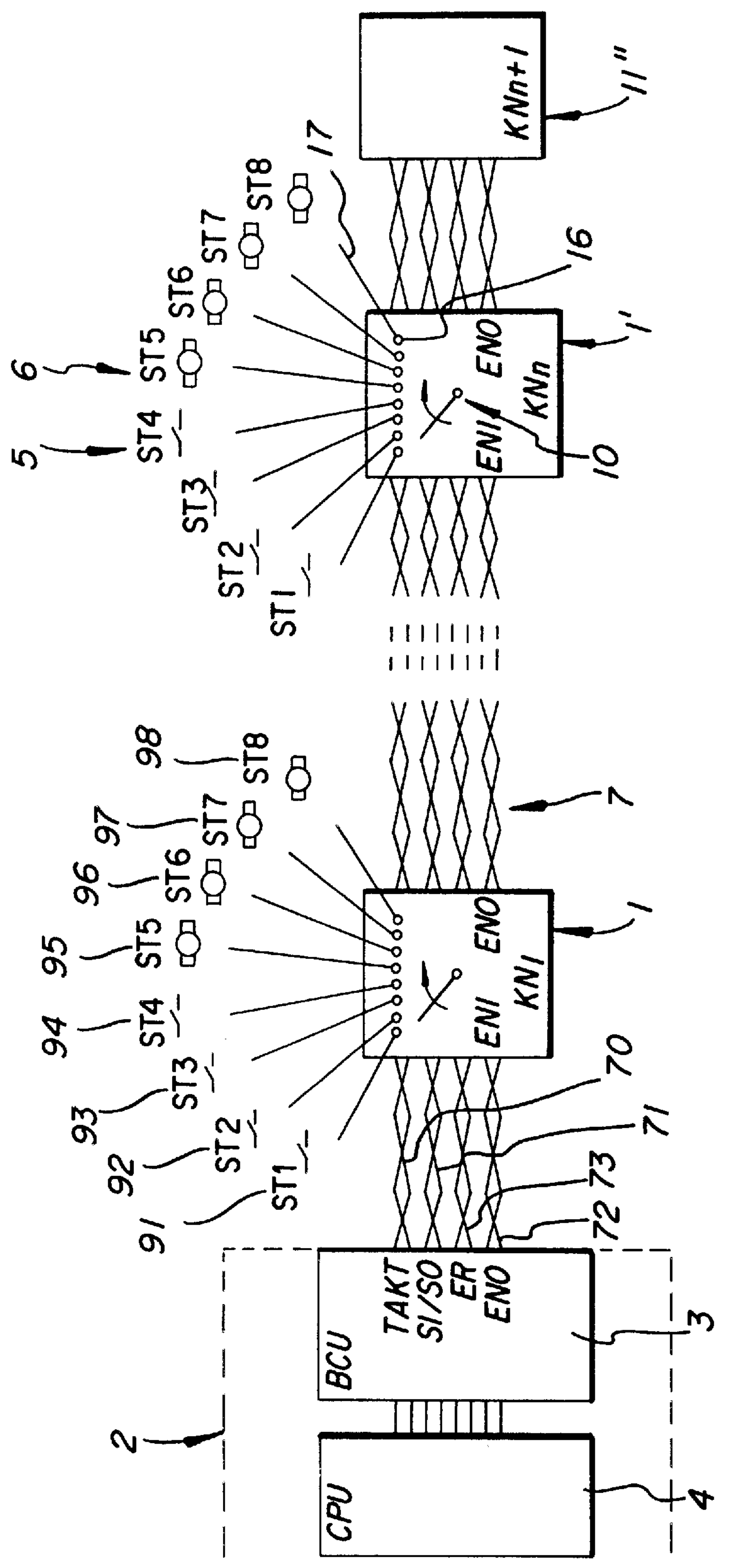
FIG. 1 is a schematic overall illustration of the data transfer system according to the invention.

The data transfer system shown in FIG. 1 features a signal processing means 2 comprising a bus control means 3 and a microprocessor unit 4, and comprises several units in the form of transmitter/receiver means 1, 1' or as a termination nodal means 1. The various transmitter/receiver means 1, 1' are provided with positions having terminals 16 for sensors 5 having the form of switches and for actors 6 having the form of motors, the sensors 5 and actors 6 being connected by means of plug-in connecting lines 17. A process control 10 shown schematically as a rotary switch is provided for selecting the positions of the stages 91, 92, 93, 94 having sensors and/or of the stages 95, 96, 97, 98 having actors. Multi-conductor, plug-in connecting cables 7 are arranged between bus control means 3 and transmitter/receiver means 1 as well as between the successive transmitter/receiver means 1' and termination nodal means 1".

The connecting cables 7 include a clock pulse line 70, a signal line 71, a release line 72 and an acknowledgement line 73, each in the form of a twisted twin-conductor. Between a power supply unit of the signal processing means 2 and the transmitter/receiver means 1 as well as between the transmitter/receiver means 1 and 1' and between the transmitter/receiver means 1' and the termination nodal means 1" there are provided known plug-in connecting cables (not illustrated) for supplying the transmitter/receiver means and the termination nodal means with energy.

Figure 2:
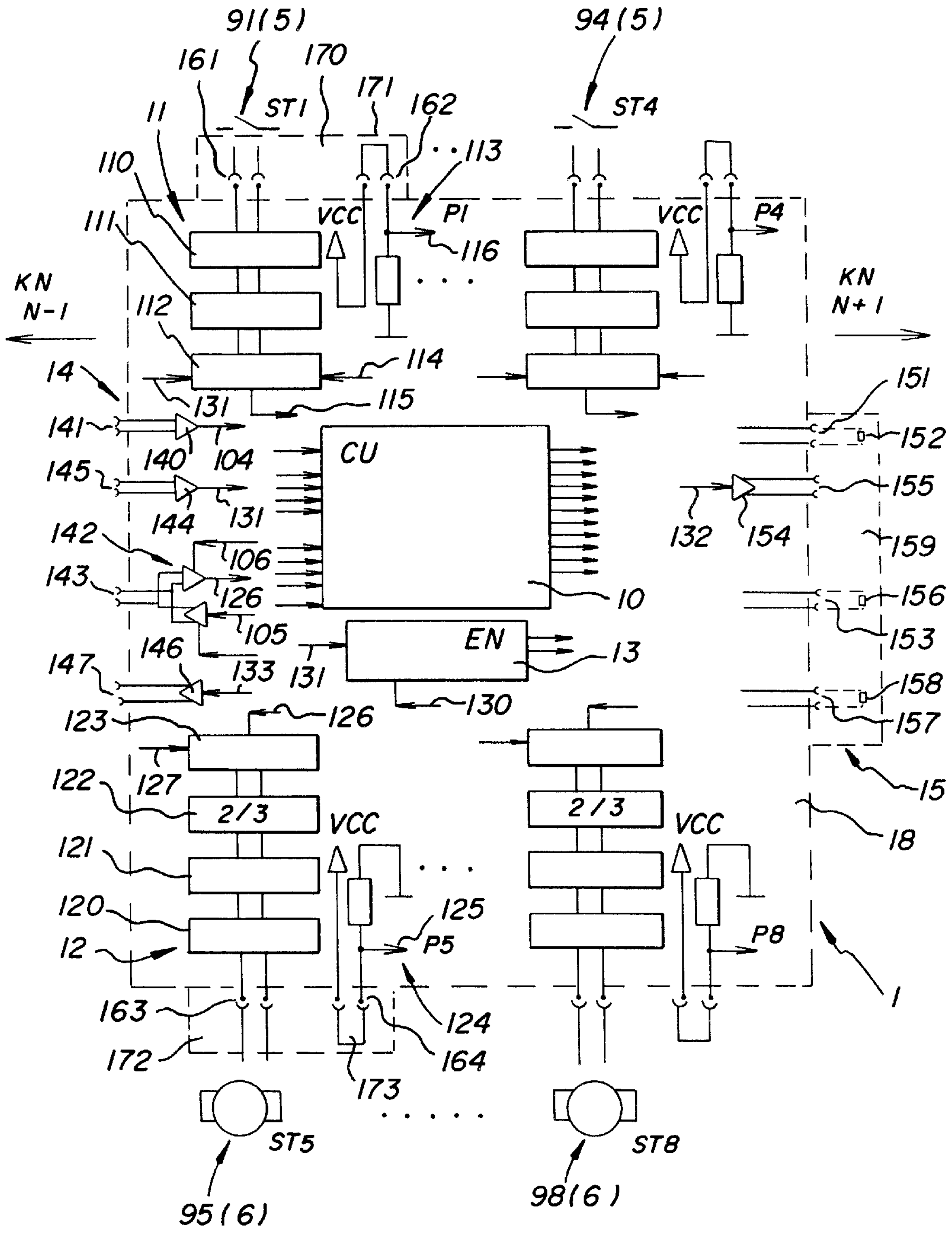
FIG. 2 is a block diagram of a transmitter/receiver means of the data transfer system according to FIG. 1.

On a PCB 18, the transmitter/receiver means 1 shown in FIG. 2 comprises the process control means 10, a take-over means 11 for the signal conditions of the sensors 5, a transfer means 12 for the signal conditions of the actors 6, a release means 13 for activating or deactivating the transmitter/receiver means, as well as an input interface to connect the bus control means 3 and an output interface to connect the successive transmitter/receiver means 1'. The process control means 10 shown in FIG. 3 includes a clock pulse monitoring means 101, 102, 103 and a transmitter/receiver control means 100. They are used for detecting the suppression of clock pulses during one, two or three clock periods TAKT at the clock signal input 104 and for controlling the flow direction of sensor and actor signals in the input interface 14 and the output interface 15 by means of a control signal DIR at the signal direction output 106.

For each of the stages 91, 92, 93, 94 the take-over means 11 comprises an input circuit 110 for the sensor 5, an optocouple 111 and a signal condition memory 112 connected in series as well as a terminal checking circuit 113. At terminal point 16, by means of a plug-in connector 170, the sensor 5 is connected to a twin-connector plug-in circuit terminal 161 and a jumper wire 171 is connected across a twin-connector plug-in terminal 162 of the terminal checking circuit 113. This condition is signalled to the process control circuit 10 connected via a terminal 116 by means of a control signal P1. With its signal output 115 and its control input 114, the signal condition memory 112 is connected to the process control means 10 and with its release signal input 131 it is connected to the input interface 14 to control its signal output S1.

For each of the stages 95, 96, 97, 98, the transfer means 12 features an output circuit 120 for the actor 6, and optocouple 121, a “two out of three” select circuit 122 and a signal condition memory 123 connected in series as well as a terminal checking circuit 124.

In terminal 16, by means of a plug-in connector 172 the actor 6 is connected to a twin-connector plug in terminal 163 of the input circuit 120 and a jumper wire 173 is connected across a twin-connector plug-in terminal 164 of the terminal checking circuit 124. This condition is signalled to the process control circuit 10 connected by a terminal 125 by means of a control signal P5.

With its signal input 126, the signal condition memory 123 is connected to the input interface 14 and with its control input 127 it is connected to the process control means 10 to control an input of signals S1. The input interface 14 includes a driver circuit 140 for the clock pulses TAKT the output of which is connected to the clock pulse input 104 of the process control means 10 and the differential input of which is connected 6 to a twin-connector plug-in terminal 141 of the input interface 14 and to a twin-connector plug-in terminal 151 of the output interface 15.

Furthermore, there is provided a bi-directional driver circuit 142 for the SOP signals of the sensors 5 and for the SIA signals of the actors 6, the differential outputs and inputs of which being connected to a twin-connector plug-in terminal 143 of the input interface and to a twin-connector plug-in terminal 153 of the output interface. The unipolar input of the driver is connected to a signal output 105 for the SOP signal of the process control means 10 and the unipolar output of the driver for the CR signal is connected to the signal input 126 of the signal condition memory 123 of the stages 95, 96, 97, 98. The control input for determining the signal flow direction DIR in the driver is coupled to the control output 106 of the process control means 10.

In addition, the input interface 14 features a driver circuit 144 for a release signal ENI the output of which is connected to an input 131 of the release means 13 at a differential input of which is coupled to a twin-connector plug-in terminal 145. The input interface 14 also comprises a driver circuit 146 for an acknowledgement signal ER, the differential output being connected to a twin-connector plug-in terminal 147 of the input interface 114 and the twin-connector plug-in terminal 157 of the output interface 15, and the input being connected to an output 133 of the release means 13.

In the output interface 15 a driver circuit 154 is arranged for a release signal ENO directed at the next nodal means, the input of said circuit 154 being connected to an output 132 of the release means 13 and the differential output thereof being connected to a twin-connector plug-in terminal 155 of the output interface. The release means 13 comprises a control input 130 for an OR control signal, said input being connected to the process control means 10.

The design of the termination nodal means 1' corresponds to the transmitter/receiver means 1 shown in FIG. 2, however with no sensors 5 and actors 6 connected thereto and the termination connector 159 being coupled to the plug-in terminals of the output interface 15 instead of further transmitter/receiver means. Each of the plug-in terminals 151, 153 and 157 arranged within the termination connector 159 is provided with a terminating resistor 152, 156 and 158.

Figure 4:
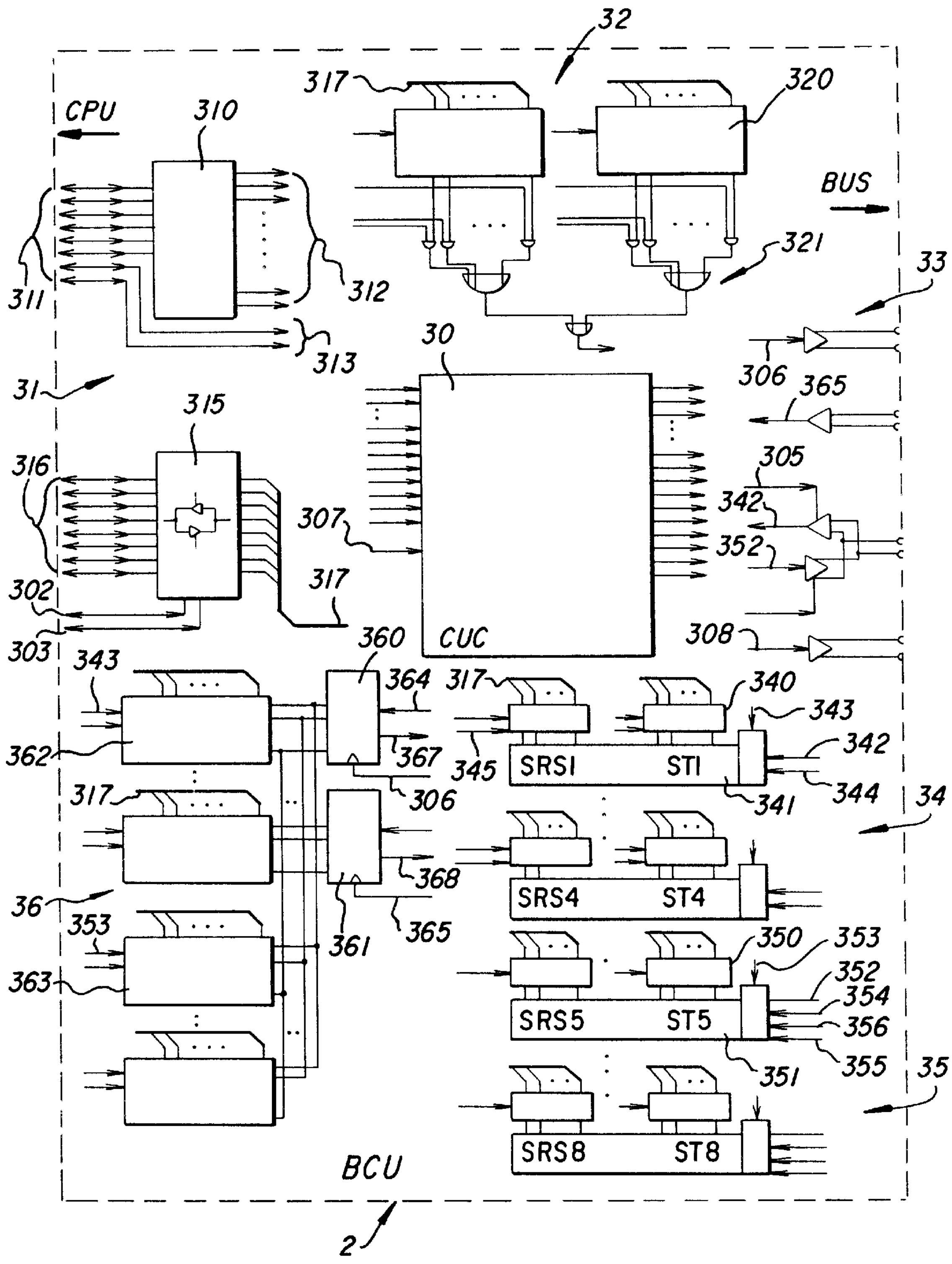
FIG. 4 is a block diagram of a bus control means of the data transfer system according to FIG. 1.

The bus control unit 3 shown in FIG. 4 comprises a process control means 30, an interface 31 to the microprocessor unit 4, a priority means 32, an output interface 33 to connect the transmitter/receiver means 1, a receiver means 34 for the SPI signals of the sensors 5, a transmitter means 35 for the SOA signals of the actors 6 and a monitoring means 36.

In order to control the clock pulses TAKT at the clock pulse signal output 306 and to control the SIP, SOA signal flow direction by means of a control signal DIRB at the signal direction output 305 as well as to activate/deactivate the transmitter/receiver means 1 by a release signal ENO at the release signal output 308 by means of the clock pulse signal input 307 for the system clock pulses TAKTG, the process control means 30 is connected to a clock pulse generator (not illustrated) of the microprocessor unit 4 and by means of a control input 302 for a control signal W and a control input 303 for a control signal RD via the interface 31 the process control means 30 is connected to the microprocessor 4 as well as by means of the control input 304 for a priority signal PW the process control means 30 is connected to the priority means 32.

Figure 5:
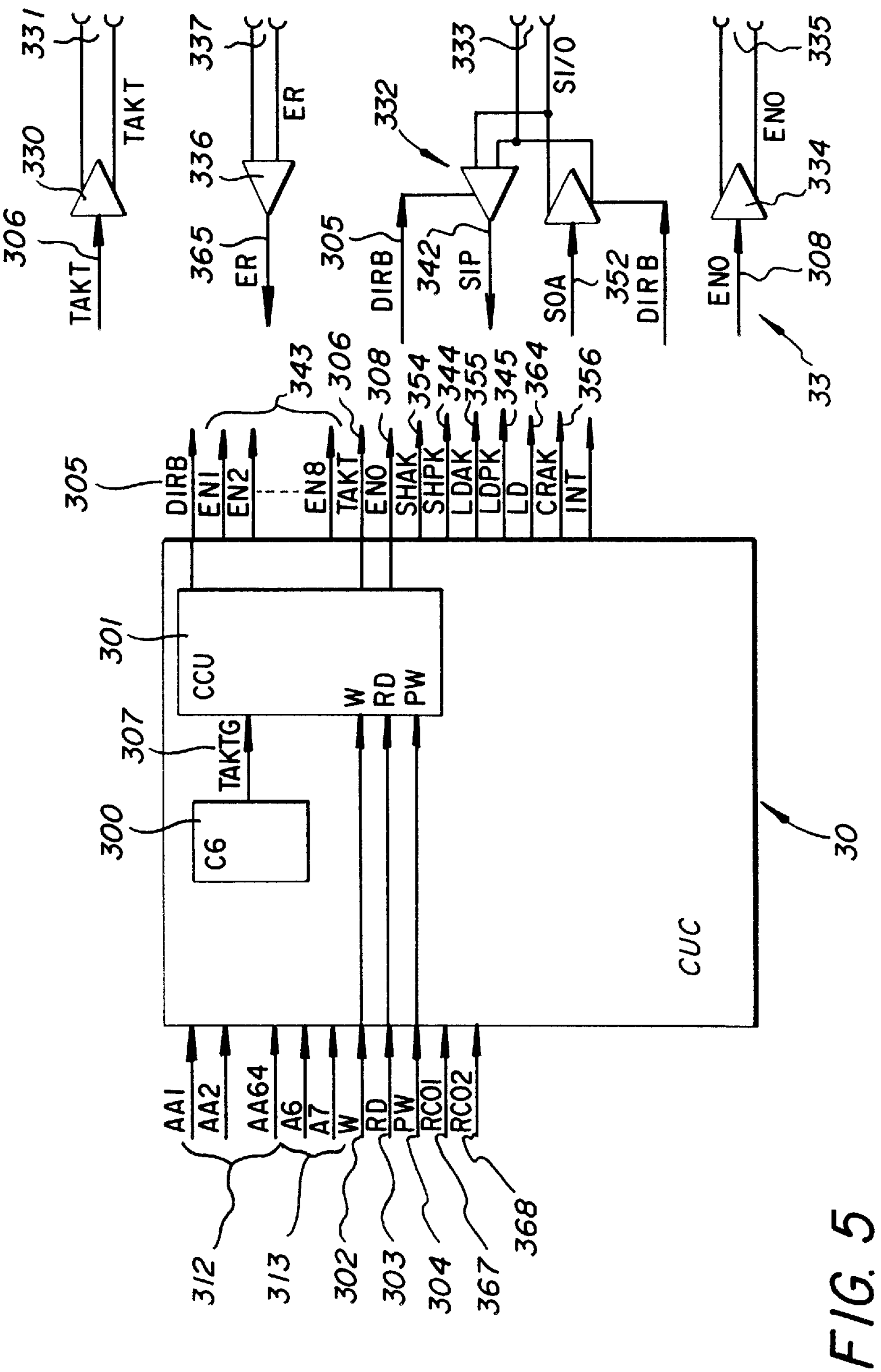
FIG. 5 is a block diagram of a process control means of the bus control means according to FIG. 4.

FIG. 5 shows a clock pulse generator 300 arranged within the process control means 30 the clock pulse output of which for the system clock pulses TAKTG is connected to a clock pulse control circuit 301. The interface 31 comprises a decoding circuit 310 for addressing registers of the bus control means 3, the decoding circuit being connected by means of an address bus 311 to the microprocessor unit 4 and by means of its address outputs 312 to registers of the priority means 32, the receiver means 34, the transmitter means 35 and the control means 36. Two terminals 313 of the address bus 311 for the address signals A6, A7 and the address outputs 312 for the address signals AA1–AA64 are additionally connected to the process control means 10.

Furthermore, the interface 31 comprises an input/output circuit 315 for the data exchange between the bus control means 3 and the microprocessor 4, the input/output circuit being connected by means of a data bus 316 to the microprocessor unit and by means of a further data bus 317 for the data signals DI/O to registers of the priority means 32, the receiver 34, the transmitter means 35, and the control means 36. In order to control the data flow direction by means of the microprocessor unit 4 the control input 302 for the control signal W and the control input 303 for the control signal RD are connected to the input/output circuit 315. To produce the priority signal PW at the output 304, two priority registers 320 and a gate circuit 321 are arranged in the priority means 32.

The output interface 33 comprises, similar to the transmitter/receiver means 1, 1', a driver circuit 330 for the clock pulses TAKT the input of which is connected to the clock pulse signal output 306 of the process control means 30, and the differential output is coupled to a twin-connector plug-in terminal 331 of the output interface. Furthermore, a bi-directional driver circuit 332 is provided for the signals SIP of the sensors 5 and for the signals SOA of the actors 6, the differential input and output of which is connected to a twin-connector plug-in terminal 335, and a driver circuit 336 for a feedback signal ER the differential input of which is connected to a twin-connector plug-in terminal 337 and the output of which is connected to a counter input 365 of the control means 36.

The receiver means 34 comprises for each of the stages 91, 92, 93, 94 of sensors 5 of the transmitter/receiver means 1, 1' four 8-bit signal condition registers 340 and a 32-bit shift register 341 connected thereto for the serial/parallel conversion of the signals SP of the signal input 342 and for intermediately storing the signals SP. By means of a control input 341 for a control signal EN1 and by means of a shift clock input 344 for a shift clock signal SHPK, the shift register 341 is connected to the process control means 30. The four signal condition registers 340 are connected to the data bus 317 for the data DSI/O and to the address output 312 for the address signals AA19–AA23, as well as to the process control means 30 by means of a load input 345 for a load signal LDPK.

The transmitter means 35 comprises for each of the stages 95, 96, 97, 98 of actors 6 of the transmitter/receiver means 1, 1' four 8-bit signal condition registers 350 and a 32-bit shift register 351 connected thereto for the parallel/serial conversion of the signals SOA of the signal output 352 and for intermediately storing the signals SOA. By means of a control input 353 for a control signal EN5, by means of a shift clock input 354 for a shift clock signal SHAK, by means of a load input 355 for a load signal LDAK and by means of an erase input 356 for an erase signal CRAK, the shift register 351 is connected to the process control means 30. The four signal condition registers 350 are coupled to the data bus 317 for the data DSI/O and to the address output 312 for the address signals AA3–AA6.

In the control means 36, for each of the stages 91, 92, 93, 94 of sensors 5 an 8-bit control register 362 and for each of the stages 95, 96, 97, 98 of actors 6 a control register 363 is arranged as well as a clock counter 360 and an acknowledgement counter 361, each of the control registers being connected to each of the counters. Furthermore, the control registers 362 and 363 are connected to the data bus 317 for the data DI/O and to the address output 312 for the address signals AA35–AA42, as well as to the process control means 30 by means of the control inputs 343 and 353 for the control signals EN1–EN8.

The clock counter 360 is connected to the clock output 306 by means of its counter input and to the process control means 30 by means of its load input 364 for a load signal LD and its counter output 367 for a counter signal RC01. The acknowledgement counter 361 is connected to the output of the driver circuit 336 by means of its acknowledgement input 365 and to the process control unit 30 by means of its load input 364 for the load signal LD and by means of its counter output for a counter signal RC 02.

The data transfer system operates as follows (explained with respect to a functional diagram for the transmitter/receiver means 1, 1' shown in FIG. 6):

First, the bus control unit and its priority registers 320, control registers 362, 363 including clock counter 360 and acknowledgement counter 361 as well as the signal condition registers 350 for the actors 6 and the signal condition registers 340 for the sensors 5 shown in FIGS. 4 and 5 are loaded with predetermined initial signal values by means of the microprocessor unit 4 shown in FIG. 1, the initial signal values depending on the number of the transmitter/receiver means 1, 1' and the number of sensors and actors connected as well as on the priority of monitoring the sensors or controlling the actors.

Figure 3:
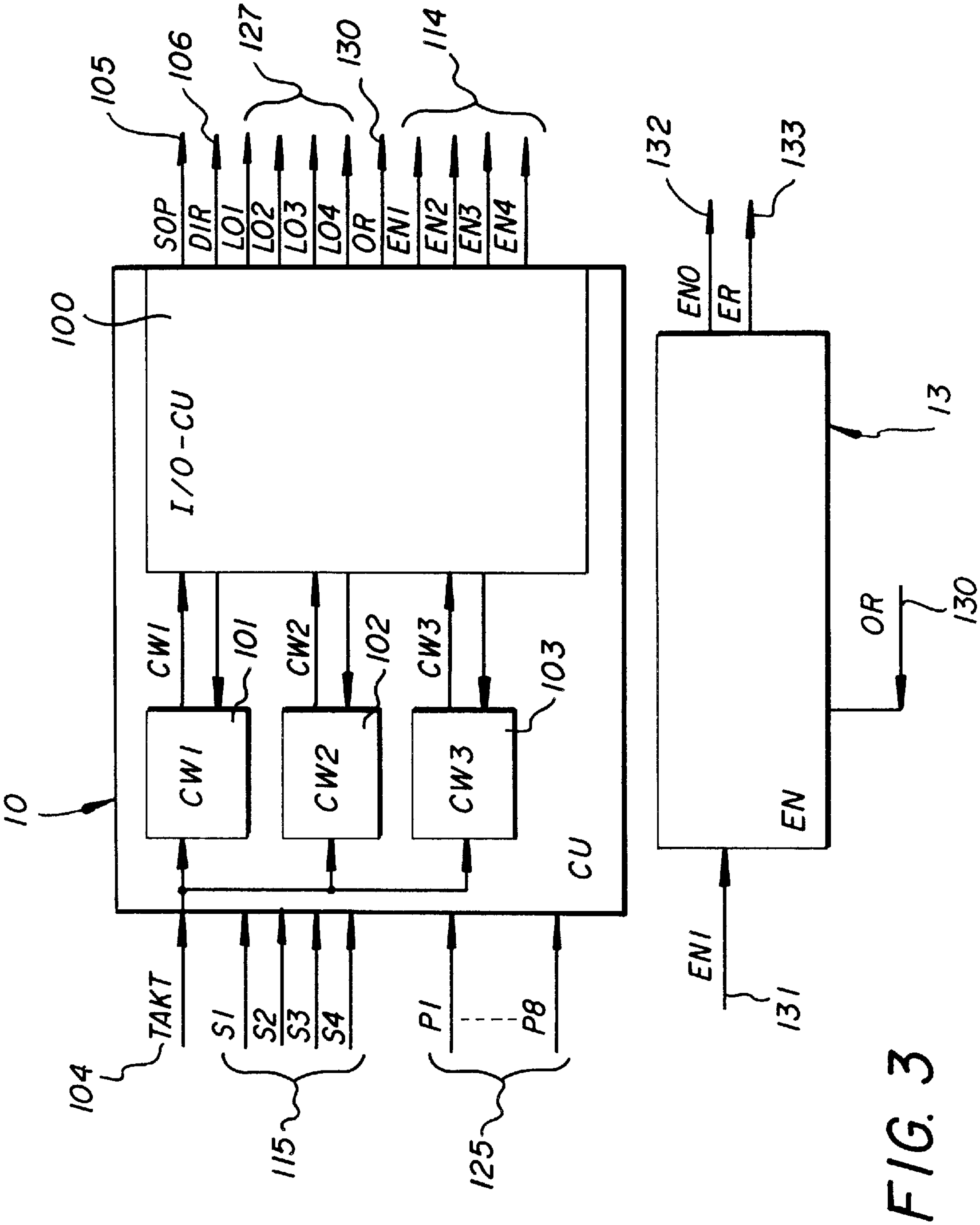
FIG. 3 is a block diagram of a process control means of the transmitter/receiver means according to FIG. 2.
Figure 6:
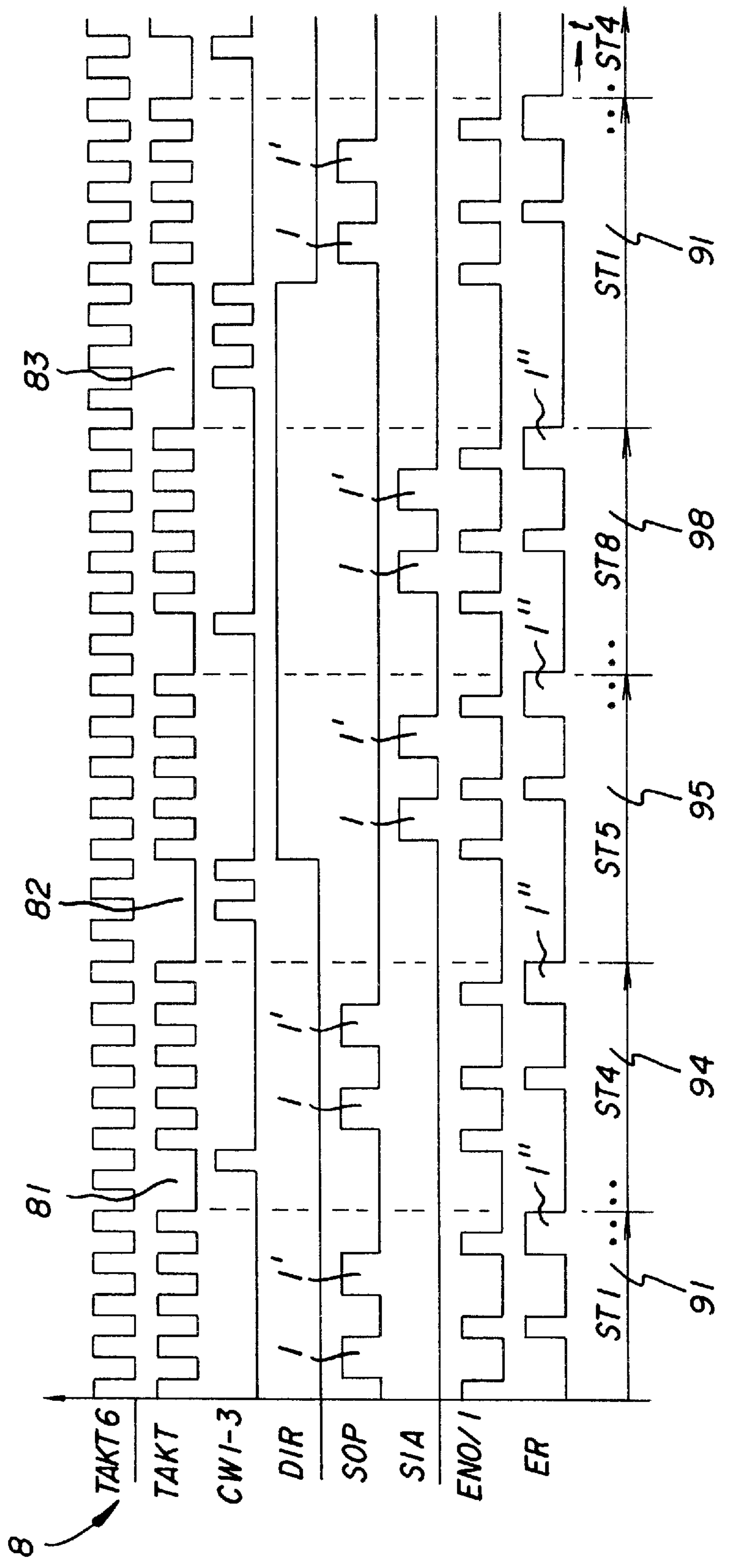
FIG. 6 is a functional diagram of the data transfer system according to FIG. 1.

Then, as shown in the functional diagram of the embodiment illustrated in FIG. 6, the bus control unit 3 in synchronism with a system clock pulse TAKTE of the clock pulse generator 300 sends a clock pulse TAKT via clock line 70 and a release signal ENO via release line 72 to the transmitter/receiver means 1 shown in FIGS. 1–3 and by means of the process control means 10 the condition of first sensor 5, e.g., a switch, of the first stage 91 is monitored at the signal condition memory 112 during the first two clock pulses for its signal condition SOP/SIP and via signal line 71 it is read into the shift register 341 of the bus control unit 3.

Subsequently, with the next clock pulse TAKT the transmitter/receiver means 1 sends a release signal ENO by means of its release means 13 to the successive transmitter/receiver means 1' and an acknowledgement signal ER to the acknowledgement counter 361 of the bus control unit 3 in order to decrement its counter reading, whereas the clock counter 360 is decremented by the clock pulses TAKT. This scanning process is then repeated with the transmitter/receiver means 1'.

As the transmitter/receiver means 1' is followed by a termination nodal means 1" without sensors and actors connected thereto, now an acknowledgement signal ER with double duration is produced by the termination nodal means 1". Then by comparing the counter readings the control means 36 checks whether all transmitter/receiver means are connected and worked up, and the process control means 30 is controlled and responds to the result.

When the scanning process of the last transmitter/receiver means 1' is terminated, the signal conditions SOP/SIP of the transmitter/receiver means 1, 1' read into the shift register are intermediately stored into signal condition registers 340 of the bus control unit 3 for further processing by the microprocessor unit 4, and the clock control circuit 301 of the bus control unit 3 skips the clock pulse TAKT for one clock period at a point in time designated 81, this being controlled by the control signal RD of the microprocessor unit 4 at the control input 303 of the process control means 30. The suppression of a clock pulse TAKT will be detected by the clock monitoring circuit 101 of the transmitter/receiver means 1, 1' and by means of its process control means 10 the advancing to the next stage 92 of the sensors 5 is effected. Then the scanning process is repeated up to the fourth stage 94.

Subsequently, as shown in FIG. 6, the clock control circuit 301 (FIG. 5) of the bus control unit 3 suppresses the clock pulse TAKT for two clock periods at the point in time designated 82, this being controlled by the control signal W at the control input 302 and by the control signal PW of the microprocessor unit 4 at the control input 304. Simultaneously, the microprocessor unit 4 loads the signal conditions SAO/SIA for the actors 6 via the input/output circuit 315 and the signal condition registers 350 into the shift register 351 of the bus control unit 3.

The suppression of the two clock pulses TAKT is detected by the clock monitoring circuit 102 of the transmitter/receiver means 1, 1' and, by means of the process control means 10, effects advancing to the fifth stage 95 of a first actor 6. Then the release signal ENO and thereafter the signal condition SOA/SIA are sent to the transmitter/receiver means 1 by the bus control unit 3, the signal condition being loaded into the signal condition memory 123 of the stage 95 and the actor, e.g., a motor, being switched on or off by means of the process control means 10.

Subsequently, a release signal ENO is sent with the next clock pulse to the successive transmitter/receiver means 1' and an acknowledgement signal ER to the acknowledgement counter 361 of the bus control unit 3 by the release means 13 of the transmitter/receiver means 1. The transfer process is then repeated for the transmitter/receiver means 1'.

Further advancing to the actors 6 of the successive stages 96, 97, 98 of the transmitter/receiver means 1, 1' is again effected by suppressing a single clock pulse TAKT, transfer of the signal conditions SOA/SIA being effected as in the case of stage 95. After termination of the transfer process to the eighth stage 98, the clock control circuit 301 of the bus control unit 3 suppresses the clock pulse TAKT for three clock periods at the point of time 83, as shown in FIG. 6, this operation being controlled by the suppression of control signals W (302) and PW (304) of the microprocessor unit 4.

The suppression of the three clock pulses TAKT is detected by the clock monitoring circuit 103 of the transmitter/receiver means 1, 1' and, by means of the process control means 10, effects returning to the first stage 91 of a first sensor 5. Subsequently, the sensors 5 of the stages 91 to 94 are scanned as has already been described.

If at the end of the scanning of stage 94 of the microprocessor unit 4 only one control signal W is sent to the control input 302 of the clock control circuit 301 or the process control means 30, the clock pulses TAKT are also suppressed for the duration of one clock period by the clock control circuit 301, thus permitting further advancing to the stages 95 to 98 as well as transferring signal conditions to the actors 6 (not illustrated in FIG. 6).

If after the transfer processes to stage 98 the control signal W from the microprocessor unit 4 is still available, advancing to the stages 91 to 94 for scanning the sensors 5 by suppressing a clock pulse TAKT is again effected, the signal flow direction for scanning and transferring the signal conditions being controlled by the microprocessor unit 4 in cooperation with the process control means 30 of the bus control unit 3 and the process control means 10 of the transmitter/receiver means 1, 1', but without the clock monitoring circuits 102 and 103 of the transmitter/receiver means 1, 1'. By suppressing the clock pulses TAKT for two or three clock periods such successive advancing from stage to stage can be interrupted and it can be changed over for single or multiple scanning of sensors 5 of the stages 91 to 94 or for single or multiple controlling of actors 6 of the stages 95 to 98.

In order to exclude an erroneous transfer of signal conditions SOA/SIA to the actors 6, the signal conditions—controlled by the microprocessor unit 4—will be transferred three times one after the other in a known manner and the correct signal conditions SOA/SIA for the actors are selected by means of a two-out-of-three select circuit 122 of the nodal means 1, 1' according to FIG. 2. If not all sensors 5 in one of the stages 91, 92, 93 or 94 and/or not all actors 6 in one of the stages 95, 96, 97 or 98 are connected to the transmitter/receiver means 1, this will be signalled to the transmitter/receiver means 1 by means of the terminal check circuits 113, 124 through the signals P1–P8 and, upon actuation of this transmitter/receiver means 1 during the scanning or control procedure, leads to the direct generation of the release signal ENO and the acknowledgement signal ER, whereby the successive transmitter/receiver means 1' is activated for monitoring the sensors 5 or controlling the actors 6.

Due to the acknowledgement signal ER directly produced by the transmitter/receiver means 1 the signal processing means 2, in response to the operation of a program, is in a position to detect whether the non-connected sensor 5 or actor 6 represents a faulty or predetermined operating condition. In the predetermined operating condition the period of time for an operating cycle consisting of the monitoring of the sensors 5 and/or the controlling of the actors 6 of all stages 91 to 98 is thus reduced. In the faulty operating condition, an error message is indicated on a display means (not illustrated) by the signal processing means 2 and the operation is halted.

The invention has been described in detail with particular reference to preferred embodiments thereof, but it will be understood that variations and modifications can be effected within the spirit and scope of the invention as set forth in the claims.

It is claimed:

1. Data transfer system for serially transferring digital signal conditions existing in the different positions of series-connected units, the serial transfer of said digital signal conditions being effected in synchronism with clock pulses via a common data transfer line (71), the clock pulses being transferred via a common clock line (70), and release signals between the units being transferred via release lines (72), characterized in that the serial transfer of said digital signal conditions of units features/utilizes transmitter/receiver means (1, 1'), the positions of the transmitter/receiver means (1, 1') being associated with successive states (91, 92, 93, 94, 95, 96, 97, 98) for sensors (5) and actors (6), is controlled by a clock pulse generator (300) of a signal processing means (2), and means (301) for suppressing predetermined clock pulses originating in the clock pulse generator, the clock pulses for the transfer of signal conditions being suppressed for a predetermined clock period for monitoring sensors (5), for a different predetermined clock period for controlling actors (6), and for a still different predetermined clock period for advancing from one stage to another (91, 92, 93, 94, 95, 96, 97, 98).

2. Data transfer system according to claim 1, wherein the clock pulse generator (300) is arranged in a bus control means (3) of the signal processing means (2) together with a process control means (30), said clock pulse generator and said process control means being controllable by means of a microprocessor unit (4) of the signal processing means.

3. Data transfer system according to claim 1, wherein the transmitter/receiver means (1,1') features a process control means (10) in which a clock monitoring circuit (101, 102, 103) and a transmitter/receiver control means (100) are arranged to detect the suppression of clock pulses.

4. Data transfer system according to claim 1, wherein the suppression of said certain clock period is recognized by means of a first clock pulse monitoring circuit (103) provided in the transmitter/receiver means (1, 1'), the suppression of said different clock period is recognized by means of a second clock pulse monitoring circuit (102), and the suppression of said still different clock period is recognized by means of a third clock pulse monitoring circuit (101).

5. Data transfer system according to claim 2, wherein the bus control means (3) features an interface (31) to the microprocessor unit (4) in which are arranged a decoder circuit (310) for addressing registers of the bus control means, an input/output circuit (315) for the data exchange from and to the microprocessor unit, and a priority means (32) as well as control inputs (302, 303, 304) to control the process control means (30) and the clock pulse control circuit (301).

6. Data transfer system according to claim 5, wherein the bus control means (3) features signal condition registers (340) and shift registers (341) as well as signal condition registers (350) and shift registers (351) by means of which the signal conditions of sensors (5) and actors (6) are stored and the signal flow can be converted from serial to parallel or vice versa.

7. Data transfer system according to claim 1, wherein each of said stages (91, 92, 93, 94) is associated with a first terminal checking circuit (113) for the sensors (5) and each of said stages (95, 96, 97, 98) is associated with a second terminal checking circuit (124) for the actors (6).

* * * * *